United States Patent [19]

Hobson

[11] Patent Number: 4,932,699

[45] Date of Patent: Jun. 12, 1990

[54] MIRROR VIEWING ANGLE ADJUSTMENT TOOL APPARATUS AND METHOD

[76] Inventor: Roger K. Hobson, 3350 E. Milton Rd., Tucson, Ariz. 85706

[21] Appl. No.: 393,384

[22] Filed: Aug. 14, 1989

[51] Int. Cl.$^5$ ............................................. B25B 9/00
[52] U.S. Cl. ................................... 294/19.1; 81/488
[58] Field of Search ................... 81/488; 294/19.1, 24

[56] References Cited

U.S. PATENT DOCUMENTS

| D. 169,412 | 4/1953 | Bordelon | D8/13 |
| D. 230,815 | 3/1974 | Ono | D8/40 |
| D. 300,760 | 4/1989 | Krokus | D8/13 |
| 3,014,749 | 12/1961 | Carrow | D8/13 |
| 3,463,533 | 8/1969 | Repiscak et al. | 294/19.1 |
| 3,614,149 | 10/1971 | Clark | 294/24 |
| 4,726,263 | 2/1988 | Lake | 294/19.1 |

Primary Examiner—Roscoe V. Parker
Attorney, Agent, or Firm—Victor Flores

[57] ABSTRACT

A tool for manually adjusting the viewing angle of said rear view mirror provided on the passenger side of vehicles. The tool is elongated for spanning the distance from a driver side of a vehicle, past the passenger side to an external rear-view mirror. The tool includes a tool end that conforms to the shape of the mirror housing enables a user to firmly enclose the housing and exert mechanical forces via the grip end to pivotally adjust the mirror to a desired viewing angle.

9 Claims, 3 Drawing Sheets

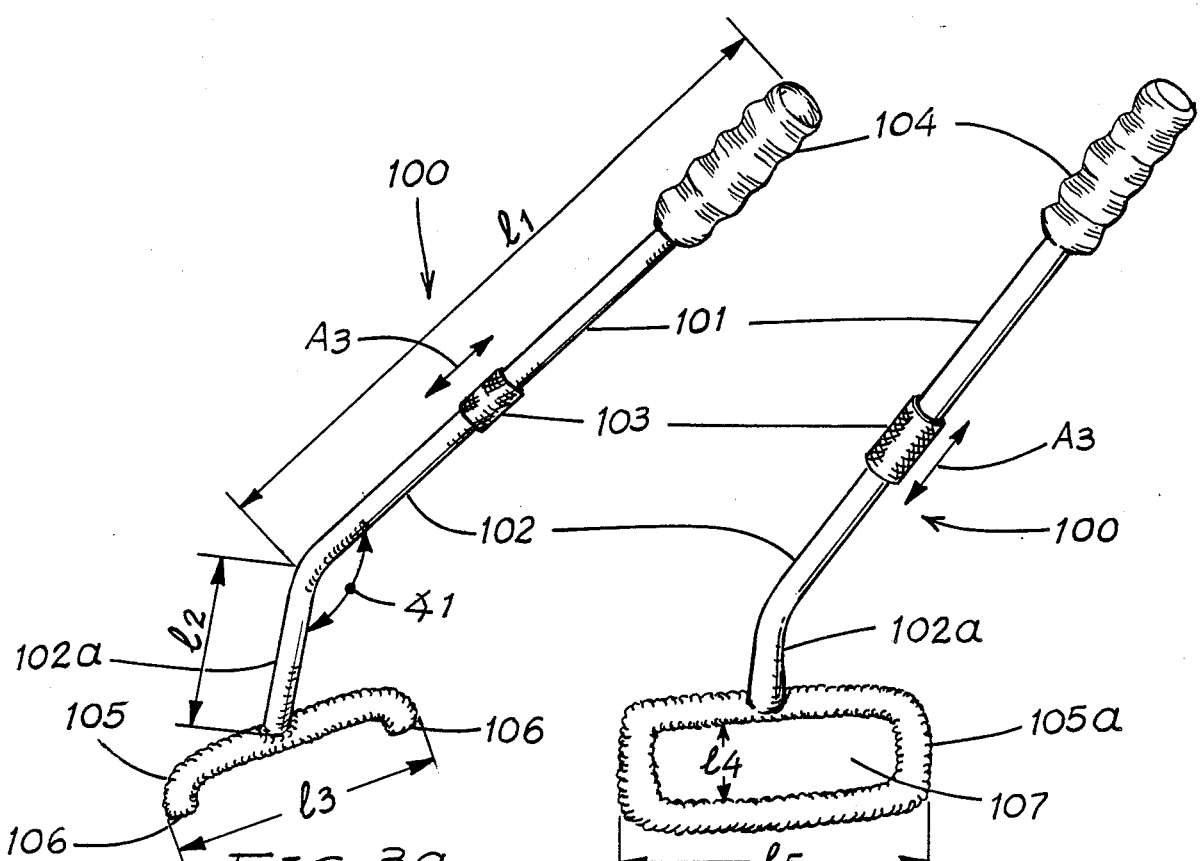
FIG. 3a
FIG. 3b
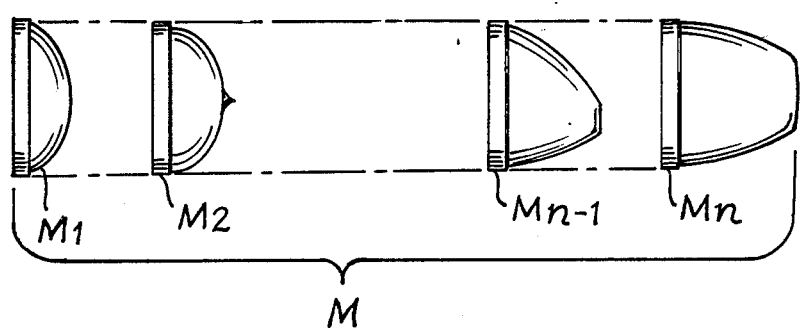
FIG. 4

MIRROR VIEWING ANGLE ADJUSTMENT TOOL APPARATUS AND METHOD

FIELD OF THE INVENTION

The present invention relates to apparatus and method for adjusting the viewing angle of mirrors. More particularly, the present invention relates to manually operated tool apparatus and method for adjusting the viewing angle of an external rear view mirror located on the passenger side of a vehicle.

DESCRIPTION OF THE PRIOR ART

Rear view mirrors are traditionally provided externally on both the driver and passenger side of vehicles. Designs known to applicant include adjustment means that are linked via a flexible cable to effect the positioning of the desired viewing angle. If a vehicle is so equipped and the linkage mechanism remains functional a driver may adjust the viewing angle without problem. However, as it often happens, the linkage mechanism breaks, or the vehicle is not equipped with the mechanical linkage to effect the positioning of the mirror to the desired viewing angle. In cases such as this, and in particular for the mirror on the passenger side, the driver must either obtain the help of a passenger to position the mirror, or endeavor in adjusting the mirror by walking around the vehicle or stretching across the seat. In many instances the driver simply does not bother to adjust the passenger side mirror because of the awkwardness of the situation. This latter situation leads to potentially hazardous operation of a vehicle. Aside from the flexible mechanical linkage commonly provided on vehicles that couples an internal lever to an external mirror, applicant is not aware of any tools that a driver can utilize to conveniently adjust the viewing angle of a side rear view mirror on the passenger side.

Therefore, a need is seen to exist for a tool for use by a driver of a vehicle for adjusting the viewing angle of a rear view mirror on the passenger side.

A need is also seen to exist for a rigid and manually operated mirror viewing angle adjustment tool that can accommodate several styles of mirror assemblies.

A need is further seen to exist for an external mirror viewing angle adjustment tool that is rigid and elongated for providing the length to reach the external passenger side rear view mirror and that is also adjustable in length for convenient storage in a vehicle.

SUMMARY OF THE INVENTION

Therefore, the primary object of the present invention is to provide for vehicle use a mirror viewing angle adjustment tool. A more particular object of the present invention is to provide a rigid and manually operated mirror viewing angle adjustment tool for use by a driver of a vehicle for adjusting the viewing angle of a rear view mirror located on the passenger side of the vehicle. Another object of the present invention is to provide a mirror viewing angle adjustment tool that can be purchased in kit form for customizing to a particular style of mirror assembly. Yet another object of the present invention is to provide a mirror viewing angle adjustment tool that is adjustable in length for convenient storage in a vehicle.

In the preferred embodiment the present invention comprises in a kit form, an apparatus comprising a plurality of rigid, elongated members that may be coupled together to accommodate a required length between a seated driver and an external rear view mirror on the passenger side of a vehicle, an angled elongated member for effecting forward reach of the side mirror, a face plate member coupled to said angled elongated member for establishing primary contact with a mirror housing and a mirror housing grasping member for effecting securement of the pivotally adjustable mirror assembly.

Therefore, to the accomplishments of the foregoing objects, the invention consists of the foregoing features hereinafter fully described and particularly pointed out in the claims, the accompanying drawings and following disclosure describing in detail the invention, such drawings and disclosure illustrating, however, but one of the various ways in which the invention may be practiced.

BRIEF DESCRIPTION OF THE DRAWINGS

FIG. 3a is a perspective view of the present of the present invention illustrating an embodiment for adjusting a mirror element pivotally housed within a stationary mirror housing.

Fig. 3b is a perspective view of the embodiment illustrated in use in FIG. 1 whereby the tool end conforms to the shape of a mirror assembly having a pivotally adjustable mirror housing and further illustrating a coupling means between rigid elongated members for adjusting length of the adjustment tool.

FIG. 4 illustrates plurality of mirror styles to which the present invention may be made to conform.

DESCRIPTION OF THE PREFERRED EMBODIMENT

Figure 1:
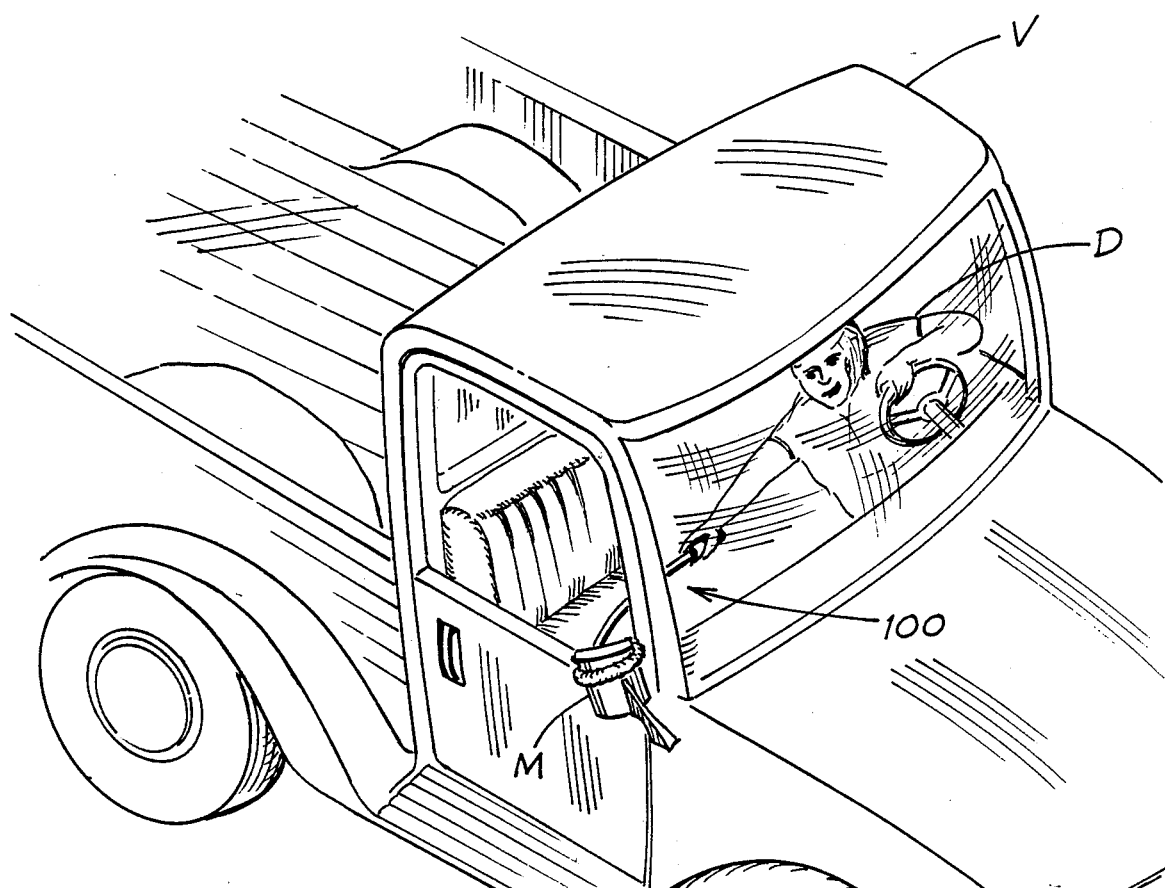
FIG. 1 is a perspective view of a driver of a vehicle utilizing the rigid mirror viewing angle adjustment tool of the present invention.
Figures 2A, 2B:
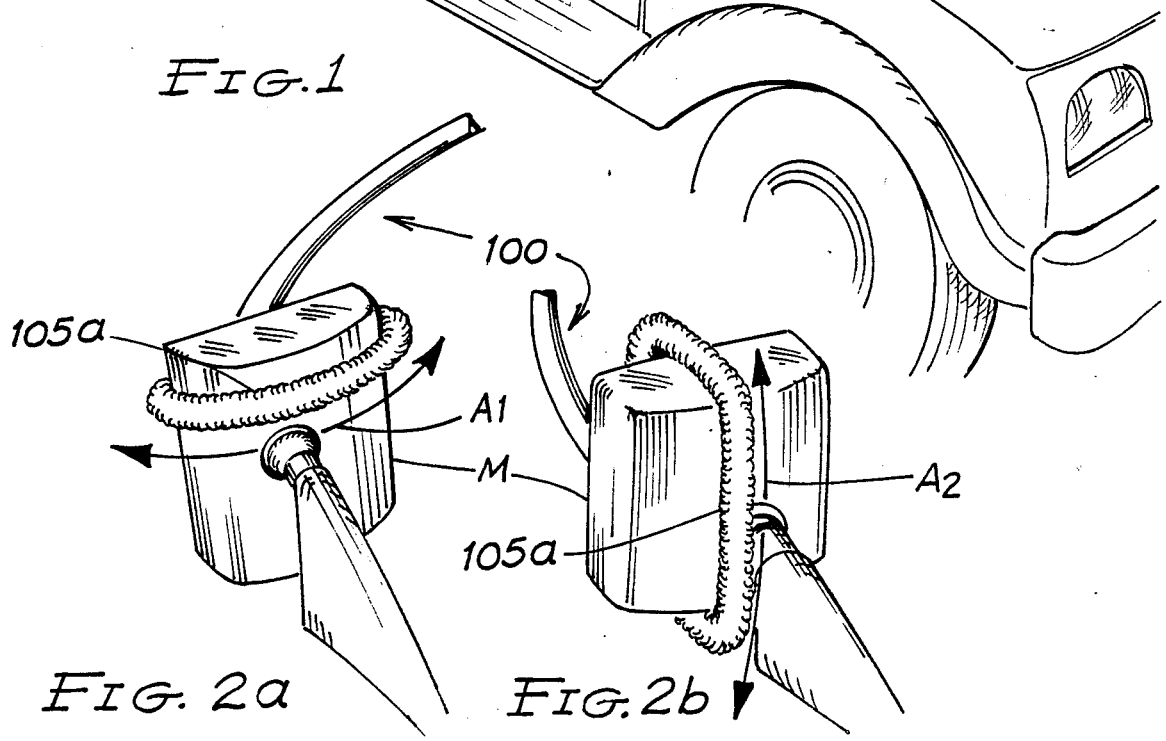
FIG. 2a is an enlarged perspective view of the present invention illustrating horizontal grasping of a mirror assembly for effecting viewing angle adjustment.
FIG. 2b is an enlarged perspective view of the present invention illustrating vertical grasping of a mirror assembly for effecting viewing angle adjustment.

Referring now to FIG. 1, where there is illustrated a driver D in a vehicle V having a mirror M externally located on the passenger side of the vehicle. Driver D is shown using the viewing angle adjustment tool 100 of the present invention to conveniently adjust the viewing angle without having to get down and physically contact the mirror M to effect the adjustment. By example, tool 100 is shown grasping mirror M latitudinally to effect the desired mirror position and viewing angle. FIGS. 2a and 2b show tool 100 in use grasping a mirror housing in a latitudinal and longitudinal manner, respectively. The particular manner of grasping depends upon the mirror style and associated shape of the tool end 105a that combine to produce the easiest horizontal and vertical adjustment, as indicated by direction arrows A1 and A2, respectively.

FIGS. 3a and 3b illustrate two embodiments of apparatus 100 that are adapted to side mirrors for vehicles that have the mirror element pivotally adjustable internal to a mirror housing, for which the embodiment illustrated in FIG. 3a is intended, and for side mirrors in which the mirror housing is pivotally adjustable, for which the embodiment illustrated in FIG. 3b is intended. The embodiments shown in FIG. 3a and 3b both comprises rigid elongated members 101 and 102 that are coupled by a coupling means 103. The coupling arrangement may include a telescopic adjustment as indicated by arrow A3 of members 101 and 103 or may include extension by addition of other rigid elongated members such as 101 (not shown) depending on the length 11 required. As best seen in FIG. 3a, member 102 is provided with an angled bent portion 102a, as indicated by angle 1, to compensate for forwardly located side mirror on the passenger side of a vehicle. The length 12 of bent portion 102a depends upon the distance of forward reach required to grasp the mirror and may require adjustable members (not shown). Both embodiments are provided with a hand grip 104 for ease of adjustment and holding apparatus 100. The embodiment of FIG. 3a has a tool end 105 that terminates at laterally spaced adjustment prongs 106. The distance 13 depends on the size of the mirror element MX being adjusted, see generally FIG. 5. The embodiment of FIG. 3b has a tool end 105a having an opening 107 that conforms to a particular mirror housing such that the tool end can be easily fitted around the mirror housing to enable pivotal adjustment. The size of the opening depends on the plurality of mirror styles M1, M2, . . . Mn-1, Mn as shown in FIG. 4 to which dimensions 14 and 15 must conform.

Figure 5:
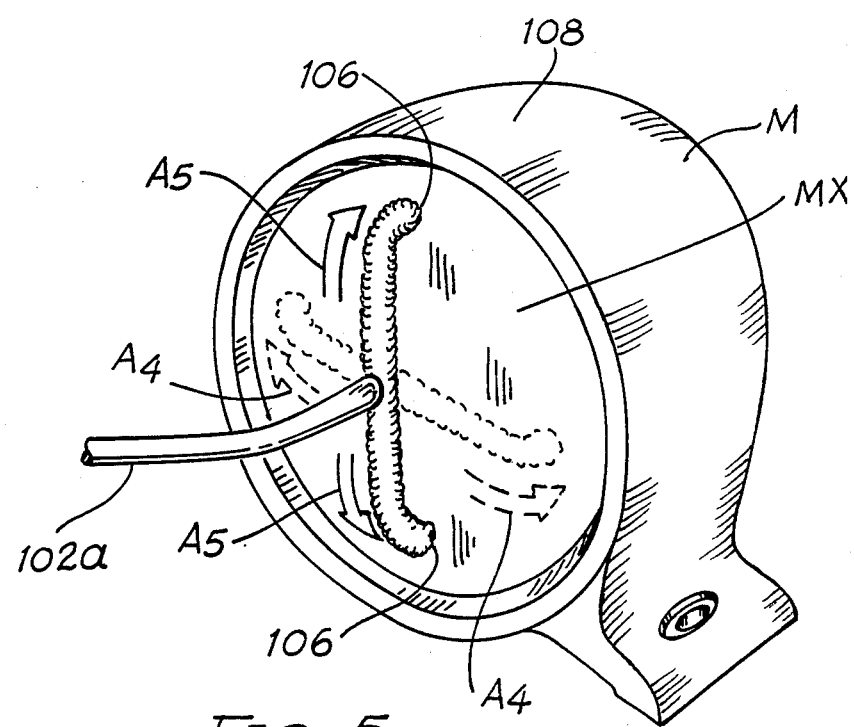
FIG. 5 is an enlarged perspective view of the embodiment illustrated in FIG. 3a showing the tool adjusting the viewing angle of an internally housed mirror element.

As discussed above the embodiment of FIG. 3a is directed to side mirrors for vehicles that have the mirror element pivotally adjustable internal to a mirror housing. FIG. 5 illustrates such a mirror 108 having internally disposed mirror element MX whereby tool prongs 106 are in contact with the surface of mirror element MX for adjustment as indicated by arrows A4 and A5.

Figure 6:
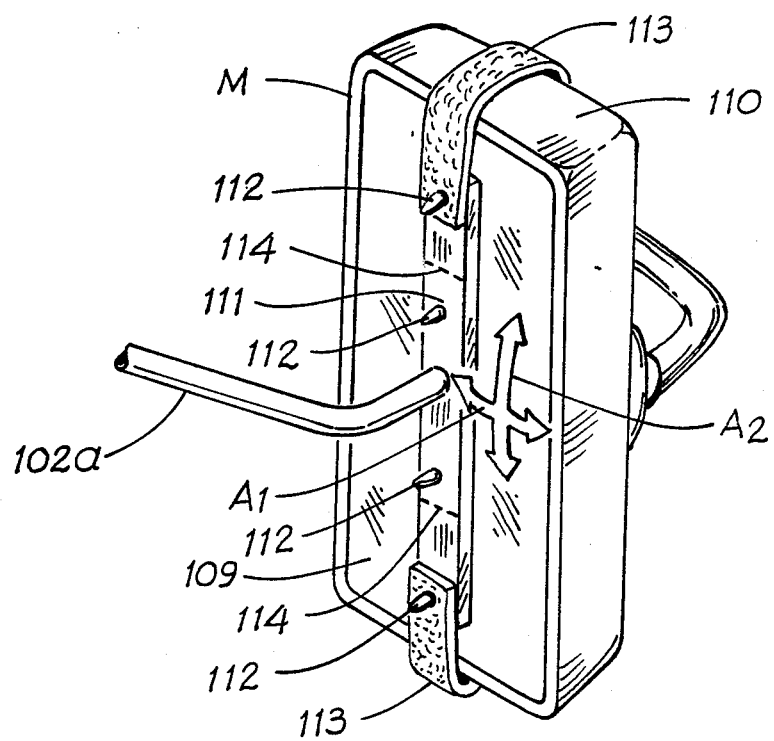
FIG. 6 is a perspective view of the present invention illustrating tool end members of a kit form variation of the embodiment shown in FIG. 3b adapted to conform to the shape of a pivotally adjustable mirror housing.

FIG. 6 illustrates a variation of the embodiment illustrated in FIG. 3b whereby the problem of the plurality of mirror styles M1 . . . Mn is addressed by providing the apparatus having a tool end in kit form including a mirror face plate member 111 for contacting mirror surface 109 and having pins 112 to which a strap 113 is attached. The kit in its unassembled and preinstalled state (not shown) includes face plate member 111 being elongated with a plurality of spaced pin members 112 and having adequate length of strap 113 to amply fit around housing 110 prior to being cut to fit. Face plate member is provided with scores 114 for selection of a suitable length to contact surface 109. The kit includes elements 101, 102, 102a, 103 and 104 for convenient assembly by a user.

Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus.

I claim:

1. A mirror viewing angle adjustment tool apparatus for use in vehicular applications, said apparatus comprising:

rigid elongated means for reaching an out-of-reach rear view mirror provided on a vehicle; and too end means for mechanically adjusting a viewing angle of said out-of-reach mirror, said tool end means being attached at one end of said rigid elongated means, said tool end means comprising an endless loop member conforming to the shape of a pivotally adjustable housing that encloses said out-of-reach mirror, said rigid elongated means including a plurality of elongated members, a one of said plurality of elongated members having a grip means attached at one end and another one of said plurality of elongated members having said tool end means attached at one end and coupling means detachably joining said plurality of elongated members.

2. A mirror viewing angle adjustable tool apparatus as recited in claim 1, wherein said another one of said plurality of elongated members having an angled bent portion for enabling mechanical contact and extended reach of said out-of-reach mirror.

3. A mirror viewing angle adjustment tool apparatus for use in vehicular applications, said apparatus comprising:

rigid elongated means for reaching an out-of-reach rear view mirror provided on a vehicle; and tool end means for mechanically adjusting a viewing angle of said out-of-reach mirror, said tool end means being attached at one end of said rigid elongated means, said tool end means comprising a dual prong means for contacting a face portion of a pivotally adjustable out-of-reach mirror, said rigid elongated means including a plurality of elongated members, a one of said plurality of elongated members having a grip means attached at one end and another one of said plurality of elongated members having said tool end means attached at one end and coupling means detachably joining said plurality of elongated members.

4. A mirror viewing angle adjustment tool apparatus as recited in claim 3, wherein said another one of said plurality of elongated members having angled bent portion for enabling mechanical contact and extended reach of said out-of-reach mirror.

5. A mirror viewing angle adjustment tool apparatus for use in vehicular applications, said apparatus comprising:

rigid elongated means for reaching an out-of-reach rear view mirror provided on a vehicle; and tool end means for mechanically adjusting a viewing angle of said out-of-reach mirror, said tool end means being attached at one end of said rigid elongated means, said tool end means including:

mirror face plate member provided on said one end of said rigid elongated means, a plurality of spaced pin members provided on a backside of said face plate member, and strap means for firmly wrapping around a pivotally adjustable housing that encloses said out-of-reach mirror, said strap means having spaced eyelets at opposing ends for engaging said pin members after being firmly wrapped around said pivotally adjustable housing.

6. A mirror viewing angle adjustment tool apparatus as recited in claim 5, further comprising:

grip means for improving hand hold of said tool apparatus, said grip means being attached at other end of said rigid elongated means.

7. A mirror viewing angle adjustment tool apparatus as recited in claim 5, wherein said rigid elongated means includes:
- a plurality of elongated members, a one of said plurality of elongated members having a grip means attached at one end and another one of said plurality of elongated members having said tool end means attached at one end; and
- coupling means detachably joining said plurality of elongated members.

8. A mirror viewing angle adjustment tool apparatus as recited in claim 7, wherein said another one of said plurality of elongated members having an angled bent portion for enabling mechanical contact and extended reach of said out-of-reach mirror.

9. A method of adjusting a viewing angle of a vehicle's passenger side external rear view mirror, said method comprising the steps of:

(a) providing a mirror viewing angle adjustment tool apparatus, said tool apparatus comprising:
- rigid elongated means for reaching said rear view mirror, and
- tool end means for mechanically adjusting a viewing angle of said out-of-reach mirror, said tool end means being attached at one end of said rigid elongated means and comprising an endless loop member conforming to the shape of a pivotally adjustable housing that encloses said out-of-reach mirror;

(b) positioning said tool end means around said pivotally adjustable housing that encloses said rear view mirror; and (c) manipulating said apparatus at other end of said rigid elongated means to exert mechanical force on said housing to adjust said mirror and thereby obtain a desired viewing angle.

* * * * *

UNITED STATES PATENT AND TRADEMARK OFFICE
CERTIFICATE OF CORRECTION

PATENT NO. : 4,932,699

DATED : JUNE 12, 1990

INVENTOR(S) : ROGER K. HOBSON

It is certified that error appears in the above-identified patent and that said Letters Patent is hereby corrected as shown below:

Col. 4, claim 1 line 6 before the word "end" delete "too" and insert therefor --tool--.

Col. 4, claim 4 line 3 after "having" insert "an".

Signed and Sealed this

Twenty-fourth Day of September, 1991

*Attest:*

HARRY F. MANBECK, JR.

*Attesting Officer*  *Commissioner of Patents and Trademarks*